United States Patent
Schneider

(10) Patent No.: US 11,370,295 B2
(45) Date of Patent: Jun. 28, 2022

(54) OBD-CAPABLE AIR-FLAP APPARATUS

(71) Applicant: Röchling Automotive SE & Co. KG, Mannheim (DE)

(72) Inventor: Jürgen Schneider, Worms (DE)

(73) Assignee: Röchling Automotive SE & Co. KG, Mannheim (DE)

(*) Notice: Subject to any disclaimer, the term of this patent is extended or adjusted under 35 U.S.C. 154(b) by 125 days.

(21) Appl. No.: 15/930,684

(22) Filed: May 13, 2020

(65) Prior Publication Data

US 2020/0361305 A1  Nov. 19, 2020

(30) Foreign Application Priority Data

May 15, 2019 (DE) .................. 10 2019 112 701.7

(51) Int. Cl.
*B60K 11/00* (2006.01)
*B60K 11/08* (2006.01)
*G07C 5/08* (2006.01)
*B60K 11/04* (2006.01)

(52) U.S. Cl.
CPC .......... *B60K 11/085* (2013.01); *B60K 11/04* (2013.01); *G07C 5/0816* (2013.01)

(58) Field of Classification Search
CPC .............................. B60K 11/085; B60K 11/04
USPC ......................................................... 180/68.1
See application file for complete search history.

(56) References Cited

U.S. PATENT DOCUMENTS

| | | | | |
|---|---|---|---|---|
| 2,276,279 A | * | 3/1942 | Asklund ............... | F01P 7/10 180/68.1 |
| 4,457,558 A | * | 7/1984 | Ishikawa ............. | B60K 11/085 296/180.5 |
| 8,473,164 B2 | * | 6/2013 | Charnesky .......... | B60K 11/085 701/49 |
| 8,727,054 B2 | * | 5/2014 | Hori .................... | B60K 11/085 180/68.1 |
| 8,752,886 B2 | * | 6/2014 | Wirth ................... | B60K 11/085 296/193.09 |
| 8,814,638 B2 | * | 8/2014 | Hasegawa ........... | B60K 11/085 454/75 |

(Continued)

OTHER PUBLICATIONS

German Search Report for corresponding DE 10 2019 112 701.7 dated May 12, 2020, 6 pgs.

*Primary Examiner* — Hau V Phan
(74) *Attorney, Agent, or Firm* — Rankin, Hill & Clark LLP

(57) ABSTRACT

An air-flap apparatus, encompassing an air-flap carrier having an air passage opening that is flowthrough-capable for air; at least three air flaps, each of which projects at least into the air passage opening and is received on the air-flap carrier movably between two operating positions with different degrees of coverage of the air passage opening; a coupling apparatus that couples the plurality of air flaps for movement together between their operating positions; and an air-flap drive system having an output member that is coupled to the at least three air flaps; the coupling apparatus includes an inner lever arrangement having at least one first lever, each first lever coupling exactly two air flaps associated with it for movement together between their operating positions; and that the coupling apparatus includes an outer lever arrangement having at least one second lever, each second lever coupling either a first lever and a single air flap not directly connected to the first lever, or two first levers, for movement together.

14 Claims, 7 Drawing Sheets

(56) References Cited

U.S. PATENT DOCUMENTS

| | | | | |
|---|---|---|---|---|
| 8,983,735 B2* | 3/2015 | Konishi | ............... | B60K 11/04 |
| | | | | 701/49 |
| 9,446,660 B2 | 9/2016 | Yoshiyuki et al. | | |
| 9,537,458 B2 | 1/2017 | Lee et al. | | |
| 9,662,963 B2* | 5/2017 | Schneider | ............ | B60H 1/3421 |
| 9,758,031 B2* | 9/2017 | Edwards | ............. | B60K 11/085 |
| 9,827,848 B1* | 11/2017 | Sangha | ............... | B60K 11/085 |
| 10,029,558 B2* | 7/2018 | Frayer, III | ........... | B60K 11/085 |
| 10,323,852 B2 | 6/2019 | Takanaga et al. | | |
| 2010/0243352 A1* | 9/2010 | Watanabe | ............ | B60K 11/085 |
| | | | | 180/68.1 |
| 2010/0282438 A1* | 11/2010 | Wirth | .................. | B60K 11/085 |
| | | | | 165/67 |
| 2014/0335778 A1* | 11/2014 | Takanaga | ................. | F24F 7/00 |
| | | | | 454/333 |
| 2014/0346809 A1* | 11/2014 | Lee | .................... | B60K 11/085 |
| | | | | 296/180.5 |
| 2018/0170170 A1* | 6/2018 | Nam | ................... | B60K 11/085 |

* cited by examiner

OBD-CAPABLE AIR-FLAP APPARATUS

This Application claims priority in German Patent Application DE 10 2019 112 701.7 filed on May 15, 2019, which is incorporated by reference herein.

The present invention relates to an air-flap apparatus encompassing

- an air-flap carrier having an air passage opening that is flowthrough-capable for air;
- at least three air flaps, each of which projects at least into the air passage opening and is received on the air-flap carrier movably between two operating positions with different degrees of coverage of the air passage opening;
- a coupling apparatus that couples the plurality of air flaps for movement together between their operating positions; and
- an air-flap drive system having an output member that is coupled to the at least three air flaps in such a way that a movement of the output member produces a movement of the at least three air flaps between their operating positions.

BACKGROUND OF THE INVENTION

Air-flap apparatuses of this kind for motor vehicles are commonly known in automotive engineering. Their principal purpose is to modify the convective cooling of functional subassemblies in the engine compartment by changing the operating position of the air flaps. The plurality of air flaps are thus movable between a closed position and an open position, the coverage of the air passage opening being greater in the closed position than in the open position. Preferably the air passage opening is closed for a flow of air through it when the at least one air flap is in the closed position, and in the open position is flowthrough-capable with as little flow resistance as possible. This applies not only to the existing art but also to the present Application.

Air-flap apparatuses of the kind recited above are known, for example, from DE 10 2014 006 662 A1, EP 3 002 145 B1, U.S. Pat. Nos. 9,758,031 B2, and 9,537,458 B2.

The operation of an air-flap apparatus configured as described above has an effect on the pollutant emissions of the motor vehicle because of the convective cooling, influenced thereby, of functional subassemblies such as a coolant heat exchanger and thus indirectly of the internal combustion engine. It is therefore important to be able to check the functionality of the air-flap apparatus at any time. Furnishing such functional checking reliably with acceptable complexity turns out to be more difficult in practice than it might seem at first glance.

The air-flap apparatus can of course be equipped with a plurality of sensors that can detect the presence of air flaps and their position, and convey that to a higher-order motor-vehicle control system. This would considerably complicate the design of the air-flap apparatus, however, and make the air-flap apparatus considerably more expensive.

Because only one shared air-flap drive system for the at least three air flaps is provided in air-flap apparatuses of the kind discussed here, the air-flap drive system can often continue to be operated as intended even when one of the air flaps of the air-flap apparatus has been damaged, or has in fact been knocked out of the air-flap apparatus, by external influences, for example a stone impact. With an air-flap drive system that is otherwise functional, however, such damage to the air-flap apparatus cannot, or at least cannot readily, be detected in the absence of further sensors.

SUMMARY OF THE INVENTION

An object of the present invention is therefore to refine the air-flap apparatus recited initially in such a way that the air-flap apparatus can be checked, with simple means, in terms of its functionality. This object is achieved by the present invention, with an air-flap apparatus as recited in the first paragraph of the present Application, by the fact that the coupling apparatus comprises an inner lever arrangement having at least one first lever, each first lever coupling exactly two air flaps associated with it for movement together between their operating positions; and that the coupling apparatus additionally comprises an outer lever arrangement having at least one second lever, each second lever coupling either a first lever and a single air flap not directly connected to the first lever, or two first levers, for movement together.

Thanks to the aforesaid embodiment of the coupling apparatus with an inner and an outer lever arrangement, the coupling apparatus can be configured in such a way that in the event of loss of a single one from among the plurality of air flaps, a misalignment of at least one lever of the inner lever arrangement can occur. That misalignment can influence the operation or operability of the air flap apparatus as a whole, so that the functional failure of a single one of a plurality of air flaps becomes detectable merely because of the particular configuration of the coupling apparatus.

Substantial influence on the operation of the air-flap apparatus upon loss or functional failure of only a single air flap from among the plurality of air flaps can be achieved by the fact that at least one first lever constitutes, with the air flaps coupled to it for movement together and with the air-flap carrier, a four-joint linkage whose frame is the air-flap carrier, whose links are the air flaps, and whose coupler is the first lever.

On the one hand, the above-described arrangement, constituting a four-joint linkage, is not only a particularly dependable and reliable movement coupling, but also a movement coupling that offers the designer numerous degrees of configuration freedom in terms of the desired kinematics of the movement of the air flaps together. The term "link" refers in the present Application to an arm of the four-joint linkage which is pivotably articulated with exactly one coupling point on the frame, which in the present case is the air-flap carrier. The "coupler" is that component of the four-joint linkage which is articulated on a respective joint of the two links which is remote from the frame, i.e. remote from the air-flap carrier. The coupler is movable relative to the frame. By using the first lever as a coupler it is possible to ensure that a torque path proceeding via the first lever (the second lever of the outer lever arrangement being articulated on the first lever of the inner lever arrangement) produces a predictable misalignment of the first lever in the event of a functional failure, or in particular a loss, of one of the air flaps coupled to the first lever. The misalignment can be different depending on which of the two air flaps coupled to the first lever fails. Each of those two different misalignments can, however, be predictable in and of itself.

Detection of a misalignment of the first lever upon failure of an air flap coupled to it for movement transfer can be made easier by the fact that a first lever of the inner lever arrangement, constituting a detection lever, comprises a first engagement configuration movable with it; and that a first counterpart engagement configuration is provided on the air-flap carrier. The specific arrangement of the first engagement configuration and first counterpart engagement configuration is such that when the first lever is coupled as intended to the two air flaps associated with it, the first counterpart engagement configuration is not reachable by the first engagement configuration in order to constitute a first movement-inhibiting physical engagement that inhibits a movement of the first lever in at least one movement direction. This means that as long as no misalignment of the first lever occurs, the first engagement configuration and the first counterpart engagement configuration do not come into a movement-inhibiting physical engagement in a context of movement sequences as intended for displacing the air flaps in the air-passage opening, since said lever is guided in kinematically determined fashion by the two air flaps coupled to it. The movement sequences as intended can therefore be continued and/or repeated with no influence by the first engagement configuration and the first counterpart engagement configuration.

The first engagement configuration can comprise at least one projection and/or at least one recess. The first counterpart engagement configuration can likewise comprise at least one configuration from among a projection and/or a recess. Preferably, both the first engagement configuration and the first counterpart engagement configuration each comprise at least one projection, so that a movement travel for achieving the movement-inhibiting physical engagement can be kept short.

In a damaged state, however, when the first lever is coupled to fewer than the two air flaps associated with it, the first counterpart engagement configuration is reachable by the first engagement configuration during a displacement movement of the air flaps for the purpose of changing an operating position of the air-flap apparatus, in order to constitute a first movement-inhibiting physical engagement. In the event of a loss of one of two air flaps originally coupled to the first lever, the first lever can usually pivot at least within limits around the remaining coupling point along with the air flap that is still functional; this was previously not possible, or not possible to the extent possible in the case of damage. As a result, the first lever can establish the movement-inhibiting physical engagement. The movement inhibition produced by the physical engagement is preferably a movement inhibition of the entire coupling apparatus which is detectable without additional sensor equipment, for example, by way of an increase in the drive current of an electric drive motor of the air-flap drive system. If other physical operating principles are used in the air-flap drive system, for instance in the case of a hydraulically or pneumatically actuated air-flap drive system, the movement inhibition that is produced can be detected analogously by a pressure increase in the operating fluid of the air-flap drive system.

The first lever, constituting a detection lever, can comprise one air-flap articulation location at which a respective other of the two air flaps associated with it is articulated. The first lever, constituting the detection lever, can furthermore comprise a second-lever articulation location at which a second lever of the outer lever arrangement is articulated. To ensure that a not merely slight but instead considerable misalignment of the detection lever occurs upon failure of an air flap, it is advantageous if the second-lever articulation location is arranged at a distance from each air-flap articulation location at least in a direction orthogonal to a connecting line that connects the two air-flap articulation locations. This ensures that the second lever of the outer lever arrangement can, after loss of an air flap, exert a torque on the detection lever and thereby pivot it around the remaining air-flap articulation location.

In addition or alternatively to the distance, described in the previous paragraph, of the second-lever articulation location from each of the air-flap articulation locations, the second-lever articulation location can be arranged at a distance from each air-flap articulation location of a first lever at least in a direction along a connecting line that connects the two air-flap articulation locations of the first lever. This too serves to allow a maximum torque to be exerted by the second lever on the detection lever when the coupling of the detection lever to an air flap fails at one of the air-flap articulation locations, so as to bring it as reliably and independently as possible from the operating position that exists upon occurrence of damage to an air flap into a misalignment, and in particular to establish the above-described physical engagement between the first engagement configuration and the first counterpart engagement configuration.

In addition or alternatively to a first lever of the inner lever arrangement constituting a detection lever, a second lever of the outer lever arrangement, constituting a sensor lever, can comprise a second engagement configuration movable together with it. A second counterpart engagement configuration can furthermore be provided on a first lever, coupled to the second lever constituting the sensor lever, of the inner lever arrangement so that failure of an air flap can also be sensed with the aid of the second lever of the outer lever arrangement. It is the case, analogously to what has been stated above, that when the first lever is coupled as intended to the two air flaps associated with it, the second counterpart engagement configuration is not reachable by the second engagement configuration in order to constitute a second movement-inhibiting physical engagement that contributes to inhibition of a movement of the first lever in at least one movement direction; and in a damaged state, when the first lever is coupled to fewer than the two air flaps associated with it, the second counterpart engagement configuration is reachable by the second engagement configuration in order to constitute the second movement-inhibiting physical engagement. Thus not only a first lever and the air-flap carrier, but also a first lever and the second lever, can inhibit a movement of the coupling apparatus upon failure of an air flap, by establishing a second movement-inhibiting physical engagement, this in turn being detectable in the manner already characterized, simply and without additional sensors. This includes the case in which the second movement-inhibiting physical engagement inhibits a movement of the first lever in at least one movement direction only together with a first movement-inhibiting physical engagement that is established simultaneously. Lastly, it is intended to be sufficient if the second movement-inhibiting physical engagement contributes to inhibition of a movement of the first lever in at least one movement direction. The second movement-inhibiting physical engagement can, however, also in and of itself inhibit a movement of the first lever in at least one movement direction.

The first and/or the second physical engagement can be respectively a positive engagement. The first and/or the second physical engagement can be respectively an abutting engagement.

In order to enable maximally comprehensive detection of damage states on the air-flap apparatus, the inner lever arrangement can comprise two first levers that can each be detection levers. In this case the air-flap apparatus can comprise exactly four air flaps that are coupled to one another via a coupling apparatus for movement together. An air-flap apparatus can of course comprise several groups of air flaps that are movable together, which can each be coupled via a coupling apparatus to an inner and an outer lever arrangement as described above. Preferably, the or each coupling apparatus comprises exactly one second lever.

Also for maximally comprehensive detectability of damage states, the two detection levers can be coupled by means of a sensor lever.

Very generally, detectability of a damage state of a failed air flap can exist by the fact that the air-flap drive system is signal-transferringly connected to a control apparatus, the control apparatus being embodied to detect a movement blockage of the air-flap drive system and to output a damage message signal in the event of such detection. Detection of the movement blockage has already been explained above by way of examples, for instance detection of a motor current or of an operating-fluid pressure of a hydraulic or pneumatic air-flap drive system.

The present invention further relates to a motor vehicle having an air-flap apparatus as described and refined above. The air-flap apparatus is preferably located on the front side of the vehicle onto which air blast flows in a context of forward travel. The air-flap apparatus is preferably arranged in a passthrough opening of the vehicle body which leads into the engine compartment of the motor vehicle, particularly preferably (from the standpoint of the arriving flow of air blast) in front of a heat exchanger, for instance a cooling-medium heat exchanger or a lubricant heat exchanger, so that the convectively cooling air flowing onto the heat exchanger can be controlled in terms of quantity.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which forms a part hereof and wherein.

DESCRIPTION OF PREFERRED EMBODIMENTS

Figure 1:
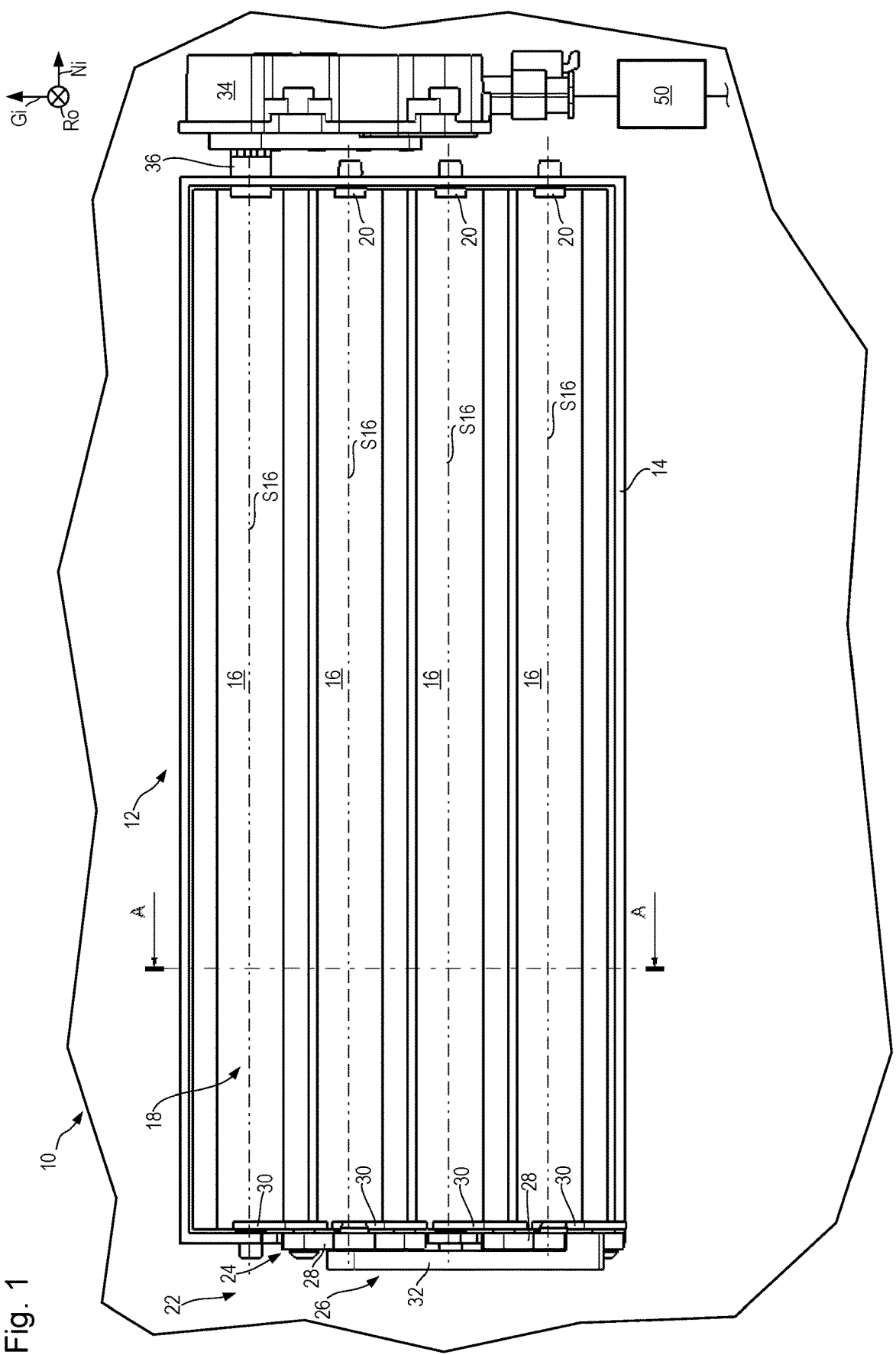
FIG. 1 is a plan view of an air-flap apparatus according to the present invention along the roll axis of a vehicle carrying the air-flap apparatus, having four air flaps in a closed position in which an air passage opening is maximally covered.

Referring now to the drawings wherein the showings are for the purpose of illustrating preferred and alternative embodiments of the invention only and not for the purpose of limiting the same, FIG. 1 depicts a portion of a vehicle 10 that carries an embodiment according to the present invention of an air-flap apparatus 12. Air-flap apparatus 12 encompasses an air-flap carrier 14 that, in the example depicted, carries four parallel air flaps 16 that are pivotable, around flap axes S16 that are likewise parallel, between a closed position depicted in FIG. 1 and an open position depicted in FIG. 3.

A Cartesian vehicle coordinate system inherent to vehicle 10, having the vehicle axes yaw axis Gi, pitch axis Ni, and roll axis Ro, is shown in the top right corner of each of FIGS. 1 to 7. Yaw axis Gi proceeds, oppositely to the direction of gravity, away from the supporting surface on which vehicle 10 is standing. Roll axis Ro proceeds from the rear of the vehicle toward the front side of the vehicle. In the exemplifying embodiment depicted, flap axes S16 are consequently arranged parallel to pitch axis Ni.

Air-flap carrier 14 defines an air passage opening 18 whose cross section that is flowthrough-capable for air is modifiable by modifying the operating position of air flaps 16. In the closed position depicted in FIG. 1, air passage opening 18 is completely or almost completely covered by the four air flaps 16 and consequently is not flowthrough-capable for air arriving parallel to roll axis Ro.

Except for the uppermost air flap 16, which is a directly driven air flap, air flaps 16 are mounted on their right side in FIG. 1, rotatably around the respective flap axis S16, by means of bearing pegs 20 in air-flap carrier 14, more precisely in its right-hand cheekpiece.

Shown on the left side in FIG. 1 is a coupling apparatus 22 that couples air flaps 16 for pivotable movement together around flap axes S16. Coupling apparatus 22 encompasses an inner lever arrangement 24 and an outer lever arrangement 26. Inner lever arrangement 24 encompasses two substantially identically configured first levers 28, of which the top (in FIG. 1) first lever 28 couples the topmost and second-from-the-top air flap 16 to one another for pivoting movement together, and of which the lower (in FIG. 1) first lever 28 couples third air flap 16 from the top and the lowest air flap 16 to one another for pivoting movement together.

Each air flap 16 comprises an air-flap lever 30 that is respectively pivotably coupled to a first lever 28. Air-flap levers 30 support air flaps 16, pivotably around their flap axis S16, on the left cheekpiece of air-flap carrier 14 on the left side in FIG. 1.

Preferably each air flap 16 is embodied in one piece with its air-flap lever, for example by injection molding.

Outer lever arrangement 26 encompasses only exactly one second lever 32, which couples the two first levers 28 to one another.

All the couplings mentioned—the coupling of air flaps 16 to air-flap carrier 14, the coupling of an air-flap lever 30 to a first lever 28, and the coupling of a first lever 28 to second lever 32—are pivotable couplings, in which the components coupled to one another can pivot relative to one another around parallel pivot axes but in which a translational relative displacement of the coupled components is inhibited. Each coupling recited therefore has exactly one degree of freedom of movement. Axial play between air-flap carrier 14 and air flaps 16, and thus also between air flaps 16 and coupling apparatus 22, can exist in order to compensate for temperature-related changes in length.

Vehicle 10 and/or air-flap carrier 14 carries or carry an air-flap drive system 34, for example an electric drive system having a rotatable output shaft 36. In the example depicted, air-flap drive system 34 is connected in directly torque-transferring fashion, by means of its output shaft 36 constituting the output member of air-flap drive system 34, to the topmost air flap 16. On the topmost air flap 16, output shaft 36 of air-flap drive system 34 replaces bearing pegs 20 that are present on the other air flaps 16, and supports the topmost air flap 16 at its drive-side longitudinal end to rotate around the associated flap axis S16.

A flap movement introduced directly by air-flap drive system 34 via output shaft 36 into the topmost air flap 16 is transferred, regardless of the movement direction, by coupling apparatus 22 to the other air flaps 16.

Figure 2:
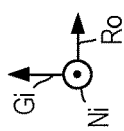
FIG. 2 is a lateral section view of the air-flap apparatus of FIG. 1 along section plane A-A.
Figure 2:
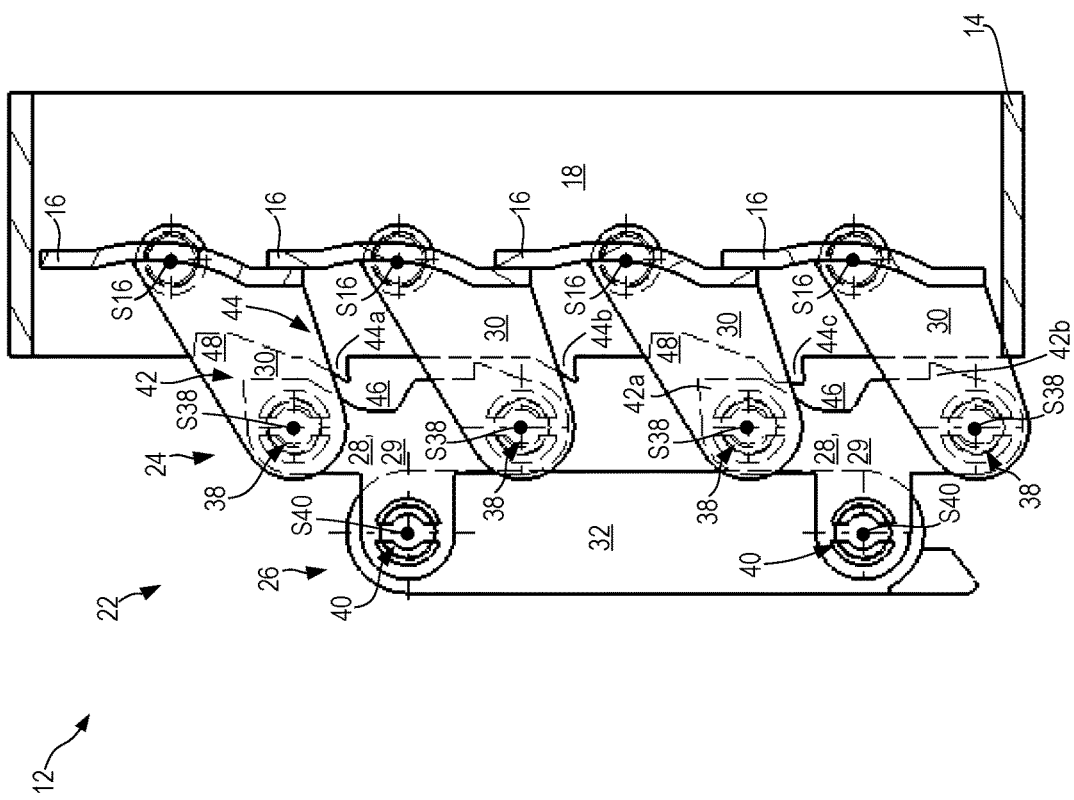

FIG. 2 is a lateral section view of air-flap apparatus 12 of FIG. 1 along section plane A-A of FIG. 1.

As is evident from FIG. 2, each first lever 28 constitutes, with the two air flaps 16 coupled by it and with air-flap carrier 14, a respective four-joint linkage. Each air flap 16 is articulated, via its air-flap lever 30, at an air-flap articulation location 38 on first lever 28 around an articulation axis S38 parallel to flap axis S16.

In addition, each first lever 28 comprises a second-lever articulation location 40 at which first lever 28 is pivotably coupled, i.e. articulated, to second lever 32 around a coupling axis S40 parallel to flap axis S16. Exactly one respective degree of freedom of movement exists between the pairwise-coupled components at air-flap articulation location 38 and at second-lever articulation location 40, and at the mounting point of air flaps 16 on air-flap carrier 14. Air flaps 16 and coupling apparatus 22, with their levers 28 and 32, are thus uniquely kinematically determined.

In order to facilitate installation of air-flap apparatus 12, the two first levers 28 are embodied identically. Each of first levers 28 comprises, on its side that faces toward the air-flap carrier during operation as intended, a first engagement configuration 42 that, in the example depicted, encompasses two first partial engagement configurations 42*a* and 42*b*. Purely as a matter of principle, the first engagement configuration can comprise a plurality of partial engagement configurations arranged at a distance from one another.

First partial engagement configuration 42*a* is constituted by a longitudinal end, embodied as a sharp projection, of first lever 28. This partial engagement configuration 42*a* is located outside the region of extent, extending between air-flap articulation locations 38, of first lever 28.

Second partial engagement configuration 42*b* is a projection that protrudes toward air-flap carrier 14 and is located closer to that air-flap articulation location 38 which is located farther from first partial engagement configuration 42*a*.

Air-flap carrier 14 comprises, on its side facing toward inner lever arrangement 24, a first counterpart engagement configuration 44 that encompasses three first partial counterpart engagement configurations 44*a*, 44*b*, and 44*c*. Each of the first partial counterpart engagement configurations 44*a*, 44*b*, and 44*c* is embodied as a projection that protrudes toward the respective first levers 28. Purely as a matter of principle, the first counterpart engagement configuration can comprise a plurality of partial counterpart engagement configurations arranged at a distance from one another.

Because of the provision of first engagement configuration 42 on each first lever 28, each first lever 28 of the exemplifying embodiment is a detection lever 29.

First lever 28 furthermore comprises a respective recess 46 that serves (preferably only) to avoid a collision of first lever 28 with first counterpart engagement configuration 44 during the operation of air-flap apparatus 12 as intended in the absence of a damage state.

Air-flap carrier 14 likewise comprises collision-avoiding recesses 48 into which, when first levers 28 and air-flap carrier 14 are in the state of maximum mutual proximity, first partial engagement configurations 42*b* of first levers 28 can be received in order to avoid an undesired collision between air-flap carrier 14 and first levers 28. The reception of first partial engagement configurations 42*b* in recesses 48 also does not furnish any effective engagement with the exception of the above-described collision avoidance.

Figure 4:
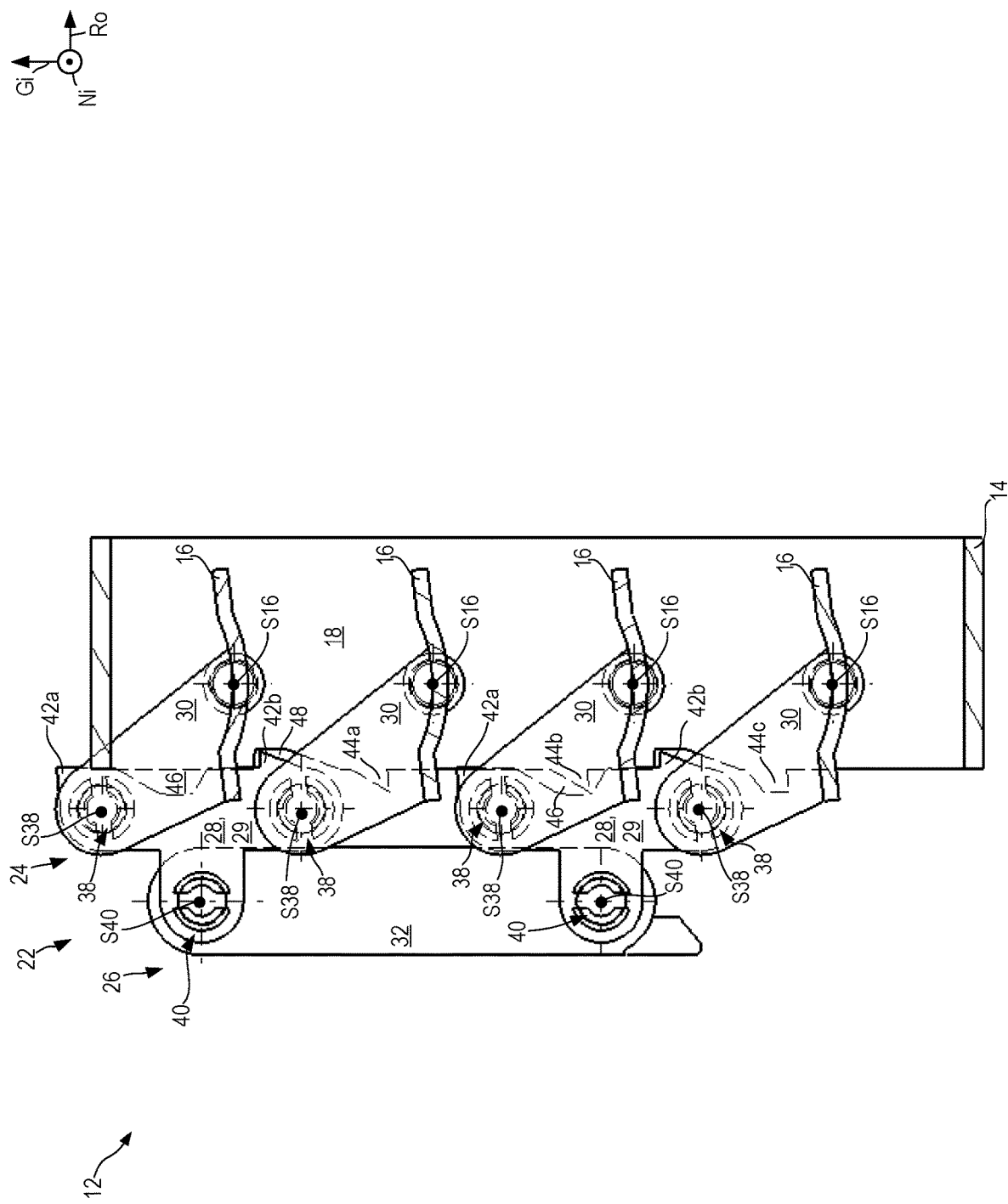
FIG. 4 is a lateral section view of the air-flap apparatus of FIG. 3 along section plane B-B.

FIG. 4 is a lateral section view, corresponding to FIG. 2, of air-flap apparatus 12 when air flaps 16 have been brought into their open position. In this position, first levers 28 are at maximum proximity to air-flap carrier 14 and abut against it. Recess 46 in first lever 28 at the bottom in FIG. 4 serves to receive first partial counterpart engagement configuration 44*b* without forming an engagement therewith. First lever 28 at the top in FIG. 4 does not need recess 46, but it is simpler to use identically configured first levers 48 than to configure each first lever 28 individually.

Because of the kinematic determinacy of the arrangement made up of air flaps 16, inner lever arrangement 24, and outer lever arrangement 26, no portion of first engagement configuration 42 comes into movement-inhibiting engagement with a portion of first counterpart engagement configuration 44 as long as air-flap apparatus 12 exhibits a correct and intended coupling state between air flaps 16 and coupling apparatus 22.

The two first levers 28 are coupled to one another by second lever 32. Because, when air-flap apparatus 12 is intact, each first lever constitutes a coupler of a four-joint linkage and is consequently displaced, because of the identical configuration of air flaps 16, only translationally along a curved path but without inherent physical rotation, second lever 32 serves only to transfer the translational movement from the top first lever 28 located closer to air-flap drive system 34 to the lower first lever 28 located farther from air-flap drive system 34.

An explanation will be given below, in conjunction with FIGS. 5 to 7, of the manner in which a failure of an individual air flap 16 can be detected without additional sensor equipment using the present air-flap apparatus 12.

A contribution to the detectability of a failure of an individual air flap 16 is made by the configuration of first lever 28 in such a way that second-lever articulation location 40 is arranged at a distance from each air-flap articulation location 38, and preferably not only at a distance along a line connecting the two air-flap articulation locations 38 of a given first lever 28, but also at a distance orthogonally to that connecting line. The result, in terms of the overall constitution of coupling apparatus 22, is that when an air-flap articulation location 38 fails, i.e. if, for example, air flap 16 contributing to the constitution thereof is lost due to stone impact or the like, when a displacement of air flaps 16 is attempted, a tilting moment is exerted on first lever 28 and results in a pivoting of first lever 28, which is also a detection lever 29, around the remaining intact air-flap articulation location 38, so that engagement configuration 42 of detection lever 29 can then come into movement-inhibiting physical engagement with counterpart engagement configuration 44 of air-flap carrier 14.

Figure 3:
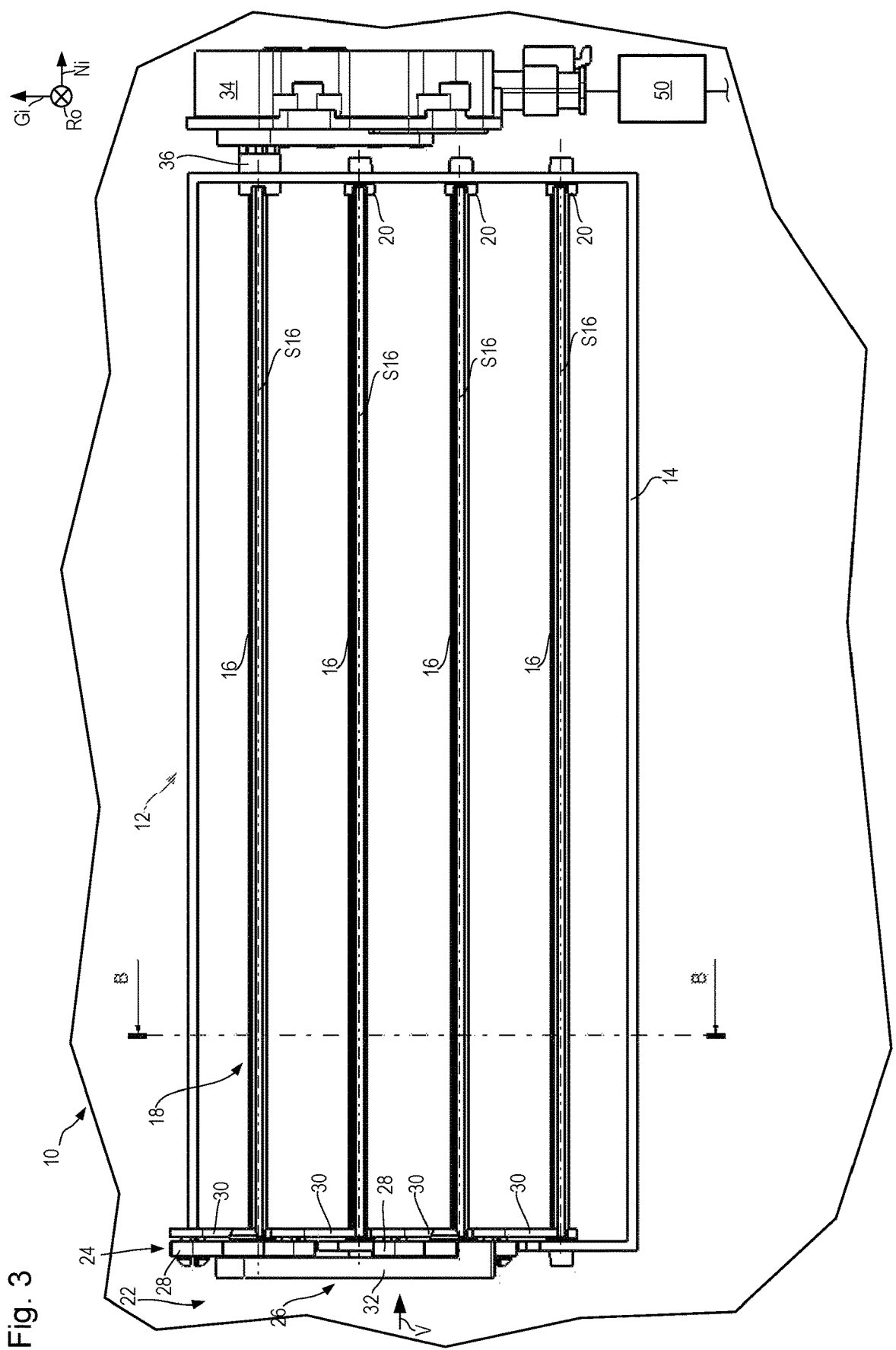
FIG. 3 is a plan view of the air-flap apparatus according to the present invention of FIG. 1 with the air flaps in an open position in which the air passage opening is minimally covered.
Figure 5:
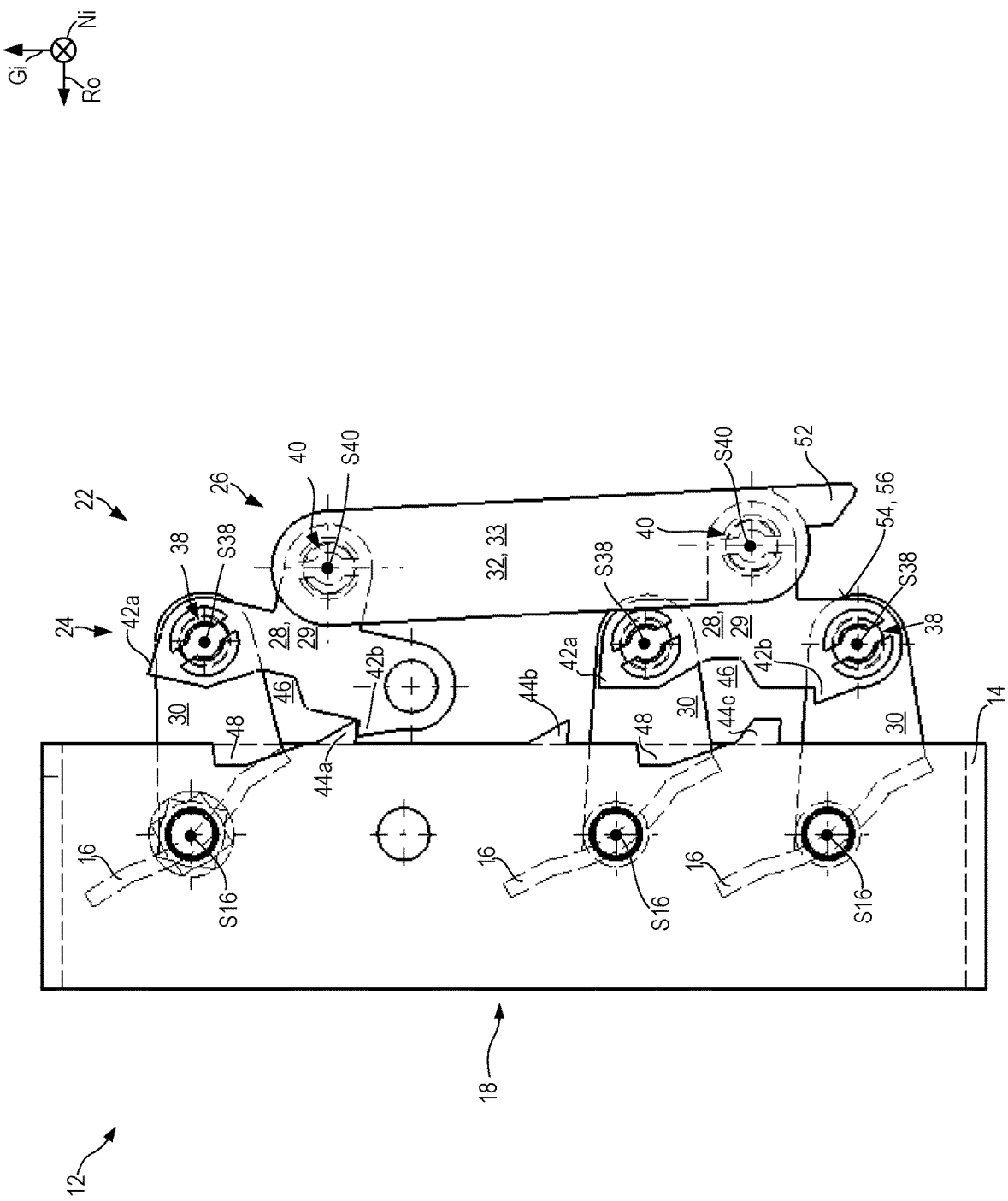
FIG. 5 is a side view of the air-flap apparatus of FIGS. 1 and 3 in the viewing direction of arrow V in FIG. 3, in an intermediate operating position between the open position and the closed position, the second air flap from the top having failed.

FIG. 5 is a side view of air-flap apparatus 12 along arrow V of FIG. 3, in an operating position that is established when air-flap apparatus 12 is displaced from the closed position of FIG. 1 into the open position of FIG. 3 even though the second air flap 16 from the top has been lost due to damage.

As a result of the loss of second air flap 16 from the top, the topmost first lever 28 in FIG. 5 (detection lever 29) is no longer kinematically determined. Upon pivoting of air flaps 16, the top first lever 28 is therefore no longer only translationally moved, but instead the translational movement is overlain by a rotational movement around the intact upper air-flap articulation location 38 that still remains. First engagement configuration 42 (more precisely, first partial engagement configuration 42b) of upper lever 28 consequently comes into physical movement-inhibiting engagement with first counterpart engagement configuration 44 (more precisely, with first partial counterpart engagement configuration 44a). This engagement between first engagement configuration 42 and first counterpart engagement configuration 44 prevents any further movement of air-flap apparatus 12 in an opening direction, with the result that an extraordinary operating situation occurs at air-flap drive system 34. For example, the movement inhibition of air flaps 16 causes the motor current delivered by air-flap drive system 34 to rise; this can be detected by a control apparatus 50 that is signal-transferringly connected to air-flap drive system 34 (see FIGS. 1 and 3), so that control apparatus 50 can output a fault message in reaction to that detection.

Figure 6:
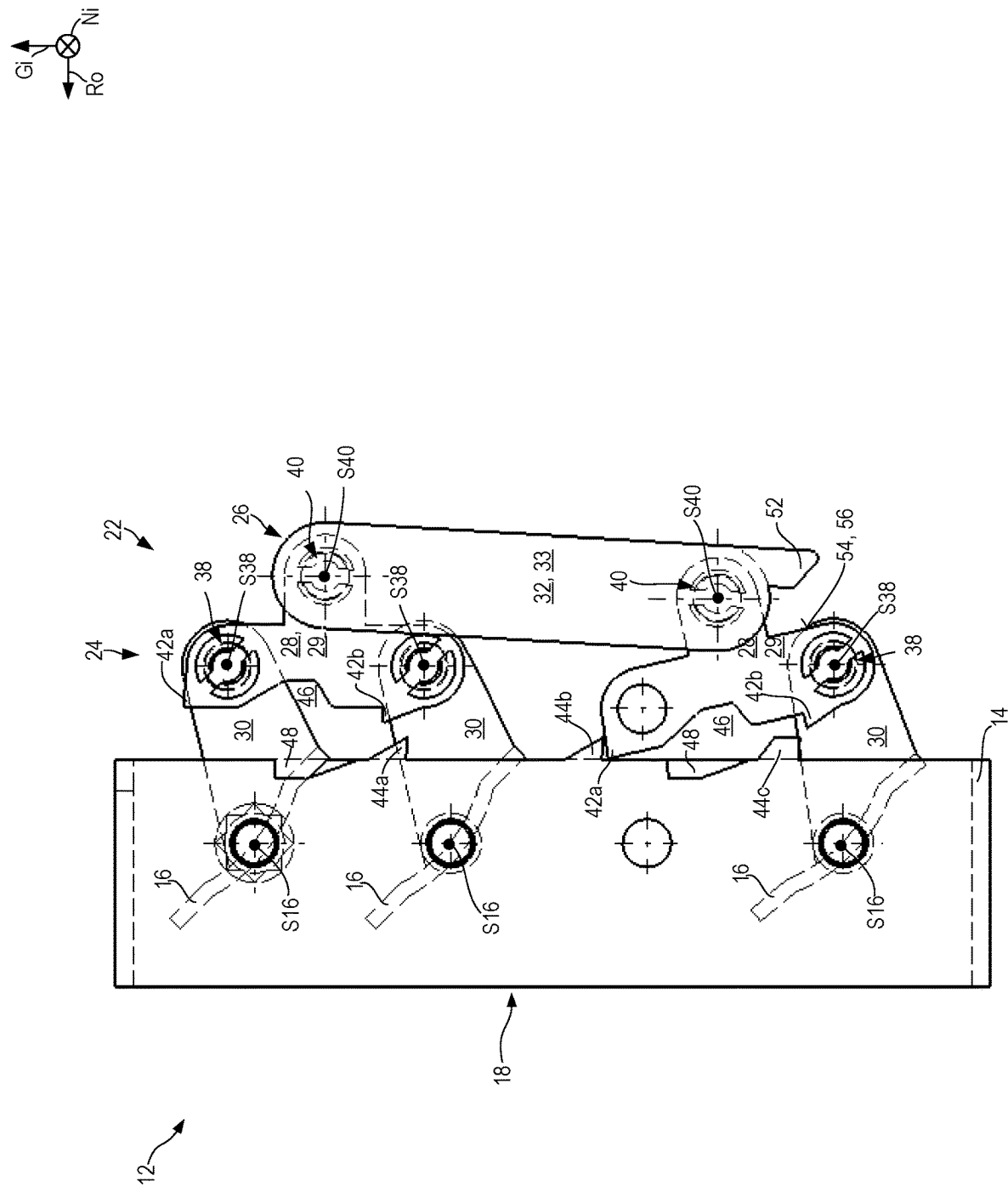
FIG. 6 is a side view in accordance with FIG. 5, the third air flap from the top rather than the second air flap from the top having failed.

FIG. 6 shows a damage instance of the same type as in FIG. 5, but caused by loss of the third air flap 16 from the top. The third air flap 16 from the top was the top one of the two air flaps 16 that were coupled to the lower first lever 28. The result of its loss is consequently that the lower first lever 28 is now kinematically undetermined. Upon pivoting of air-flap apparatus 12 from the closed position into the open position, the solely translational movement imparted to the lower first lever 28 in a context of operation as intended and in a damage-free state becomes overlain by a rotational movement around the remaining single intact air-flap articulation location 38. First engagement configuration 42 consequently comes into movement-inhibiting engagement with first counterpart engagement configuration 44, which inhibits further movement of air flaps 16 and coupling apparatus 22, in the position shown in FIG. 6, toward the open position. More precisely, first partial engagement configuration 42a of lower first lever 28 comes into movement-inhibiting engagement with first partial counter part engagement configuration 44b. As has already been described above in conjunction with FIG. 5, detection of this damage state can be accomplished once again by detection of an elevated motor current of air-flap drive system 34 by control apparatus 50.

Figure 7:
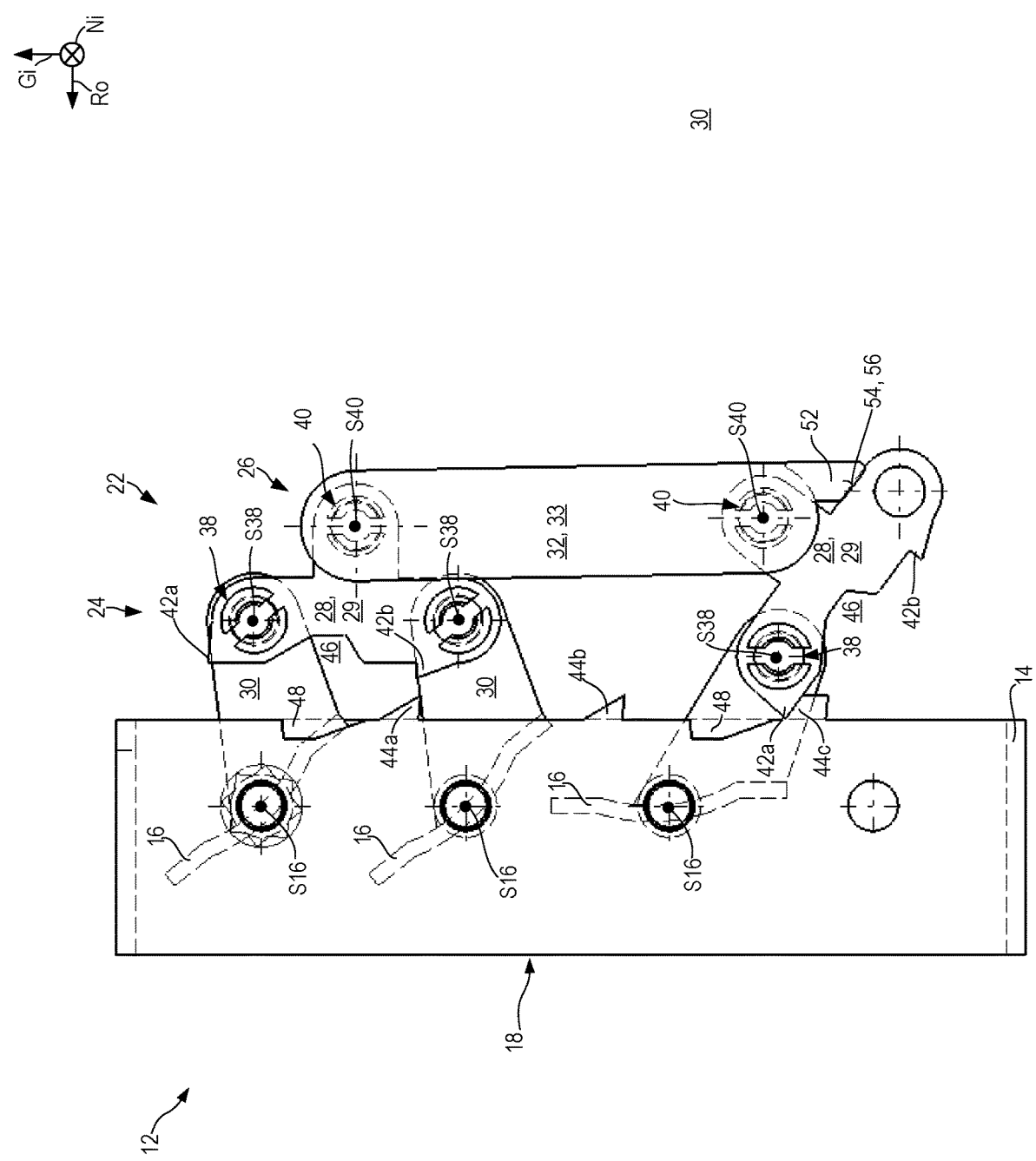
FIG. 7 is a side view in accordance with FIG. 5, the lowest air flap rather than the second air-flap from the top having failed.

FIG. 7 shows a further damage instance of the same type, but caused by loss of the lowest air flap 16. Here, upon the displacement movement of air-flap apparatus 12 from the closed position into the open position, at the lower first lever 28 the latter's solely translational movement as intended becomes overlain by an additional rotational movement, possible only in the event of damage, around the single remaining intact air-flap articulation location 38. As a result, first engagement configuration 42 once again comes into engagement with first counterpart engagement configuration 44. More precisely, first partial engagement configuration 42a comes into abutting engagement with first partial counterpart engagement configuration 44c.

Because this abutting engagement alone is not sufficient, in the context of a displacement of air-flap apparatus 12 from the closed position into the open position, to inhibit the opening movement of air-flap apparatus 12, a second engagement formation is provided on coupling apparatus 22.

Second lever 32 comprises a second engagement configuration 52 in the form of a projection that protrudes, at the longitudinal end located closer to the lowest air flap 16, parallel to the line connecting the two second-lever articulation locations 40. In the damage instance shown in FIG. 7—and only in that instance—this second engagement configuration 52 comes into abutting engagement with a flank portion 54 of first lever 28. Flank portion 54 of first lever 28 thus constitutes a second counterpart engagement configuration 56. When the abutting engagements of FIG. 7, i.e. the abutting engagement of first partial engagement configuration 42a with first partial counterpart engagement configuration 44c on the one hand, and the abutting engagement of second partial engagement configuration 52 with second partial counterpart engagement configuration 56, exist simultaneously, a movement inhibition of coupling apparatus 22, and thus of both first lever 28 and the remaining air flaps 16, then once again occurs. Detection of this movement inhibition is accomplished as already discussed in conjunction with FIG. 5.

Second lever 32 is thus a sensor lever 33 for purposes of the present Application.

Without the precautions described here, i.e. without the use of coupling apparatus 22 configured as described above and without engagement configurations 42 and 52 and counterpart engagement configurations 44 and 56 embodied on coupling apparatus 22 and on air-flap carrier 14, failure of an individual air flap 16 would be detectable, in the context of further functioning of the remaining air flaps 16, only with an increased outlay in terms of equipment. With air-flap apparatus 12 according to the present invention, the damage state of an individual lost air flap 16 can be detected without any additional sensor equipment.

Loss of the topmost air flap 16 directly affects air-flap drive system 34 and can thus be detected without difficulty, for example because actuation of air-flap drive system 34 no longer results in attainment of an end position, and air-flap drive system 34 can be operated for an arbitrary length of time in one drive direction, preferably in both opposite drive directions. This too is an operating situation that deviates from the correct operating situation, and can be detected by control apparatus 50.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. An air-flap apparatus comprising:
   an air-flap carrier having an air passage opening that is flowthrough-capable for air;
   at least three air flaps, each of the at least three air flaps projects at least into the air passage opening and is received on the air-flap carrier movably between two operating positions with different degrees of coverage of the air passage opening;

a coupling apparatus that couples the plurality of air flaps for movement together between their operating positions; and an air-flap drive system having an output member that is coupled to the at least three air flaps in such that a movement of the output member produces a movement of the at least three air flaps between their operating positions, wherein the coupling apparatus comprises an inner lever arrangement having at least one first lever, each of the at least one first lever coupling exactly two air flaps associated with the respective one of the each first lever for movement together between their operating positions; and the coupling apparatus additionally comprises an outer lever arrangement having at least one second lever, each of the at least one second lever coupling either one of the at least one first lever and a single air flap not directly connected to this one of the at least one first lever, or two of the at least one first lever, for movement together, wherein one of the at least one first lever of the inner lever arrangement, forming a detection lever, comprises a first engagement configuration movable with the one of the at least one first lever; and a first counterpart engagement configuration is provided on the air-flap carrier; such that when the one of the at least one first lever is coupled as intended to the two air flaps associated with the one first lever, the first counterpart engagement configuration is not reachable by the first engagement configuration in order to form a first movement-inhibiting physical engagement that inhibits a movement of the one of the at least one first lever in at least one movement direction; and such that with the air-flap apparatus in a damaged state, when the one of the at least one first lever is coupled to fewer than the two air flaps associated with the one of the at least one first lever, the first counterpart engagement configuration is reachable by the first engagement configuration in order to form the first movement-inhibiting physical engagement.

2. The air-flap apparatus according to claim 1, wherein said one of the at least one first lever forms, with the two air flaps coupled to this one of the at least one first lever for movement together and with the air-flap carrier, a four-joint linkage whose frame is the air-flap carrier, whose links are the two air flaps, and whose coupler is said one of the at least one first lever.

3. The air-flap apparatus according to claim 1, wherein the detection lever comprises a respective air-flap articulation location at which a respective other of the two air flaps associated with the detection lever is articulated, and comprises a second-lever articulation location at which one of the at least one second lever of the outer lever arrangement is articulated, the second-lever articulation location being arranged at a distance from each air-flap articulation location at least in a direction orthogonal to a connecting line that connects the two air-flap articulation locations.

4. The air-flap apparatus according to claim 1, wherein the detection lever comprises a respective air-flap articulation location at which a respective other of the two air flaps associated with the detection lever is articulated, and comprises a second-lever articulation location at which one of the at least one second lever of the outer lever arrangement is articulated, the second-lever articulation location being arranged at a distance from each air-flap articulation location at least in a direction along a connecting line that connects the two air-flap articulation locations.

5. The air-flap apparatus according to claim 1, wherein one of the at least one second lever of the outer lever arrangement, forming a sensor lever, comprises a second engagement configuration movable together with the one of the at least one second lever; and a second counterpart engagement configuration is provided on one of the at least one first lever, coupled to the one second lever, of the inner lever arrangement; such that when the one of the at least one first lever is coupled as intended to the two air flaps associated with the one of the at least one first lever, the second counterpart engagement configuration is not reachable by the second engagement configuration in order to form a second movement-inhibiting physical engagement that contributes to inhibition of a movement of the one of the at least one first lever in at least one movement direction; and such that with the air-flap apparatus in a damaged state, when the one of the at least one first lever is coupled to fewer than the two air flaps associated with the one of the at least one first lever, the second counterpart engagement configuration is reachable by the second engagement configuration in order to form the second movement-inhibiting physical engagement.

6. The air-flap apparatus according to claim 5, wherein at least one of the first and second movement-inhibiting physical engagements is a positive engagement.

7. The air-flap apparatus according to claim 5, wherein at least one of the first and second movement-inhibiting physical engagements is an abutting engagement.

8. The air-flap apparatus according to claim 5, wherein the inner lever arrangement comprises two first levers of the at least one first lever that are each the detection levers wherein there are two detection levers.

9. The air-flap apparatus according to claim 8, wherein the two detection levers are coupled by means of a sensor lever.

10. The air-flap apparatus according to claim 9, wherein at least one of the first and second movement-inhibiting physical engagements is a positive engagement.

11. The air-flap apparatus according to claim 9, wherein at least one of the first and second movement-inhibiting physical engagements is an abutting engagement.

12. The air-flap apparatus according to claim 1, wherein the inner lever arrangement comprises two first levers of the at least one first levers that are each the detection levers wherein there are two detection levers.

13. The air-flap apparatus according to claim 12, wherein the two detection levers are coupled by means of a sensor lever.

14. The air-flap apparatus according to claim 1, wherein the air-flap drive system is signal-transferringly connected to a control apparatus, the control apparatus being embodied to detect a movement blockage of the air-flap drive system and to output a damage message signal in the event of such detection.

* * * * *